United States Patent
Marsh et al.

[11] 3,946,482
[45] Mar. 30, 1976

[54] METHOD OF MANUFACTURING A WHEEL SPEED SENSOR

[75] Inventors: Jeffrey D. Marsh; Gregg K. McPherson, both of Ann Arbor, Mich.

[73] Assignee: Kelsey-Hayes Company, Romulus, Mich.

[22] Filed: Mar. 12, 1975

[21] Appl. No.: 557,678

Related U.S. Application Data

[62] Division of Ser. No. 418,558, Nov. 23, 1973, Pat. No. 3,890,517.

[52] U.S. Cl. ............. 29/404; 29/407; 29/436; 29/446; 73/9
[51] Int. Cl.² .......................... B23Q 17/00
[58] Field of Search ............ 29/404, 407, 436, 446; 310/168; 73/9, 88

[56] References Cited
UNITED STATES PATENTS

| | | |
|---|---|---|
| 1,827,267 | 10/1931 | Short ........................ 29/436 X |
| 2,003,412 | 6/1935 | Alden et al. .................. 29/436 |
| 2,446,621 | 8/1948 | Thiry ........................ 29/407 |
| 2,477,081 | 7/1949 | Peirce ...................... 29/407 UX |
| 3,199,186 | 8/1965 | Simpson ..................... 29/450 |
| 3,362,213 | 1/1968 | Van Deven et al. ............. 73/9 |
| 3,461,529 | 8/1969 | Van Dorn .................... 29/451 |
| 3,703,761 | 11/1972 | Van Winsen et al. ............ 29/436 |
| 3,793,545 | 2/1974 | Leiber et al. ................ 310/168 |

*Primary Examiner*—Charlie T. Moon
*Attorney, Agent, or Firm*—Harness, Dickey & Pierce

[57] ABSTRACT

A wheel speed sensor including a rotor and a stator with the stator being coaxially disposed within an elastomeric member for incremental axial movement upon engagement with the rotor. The stator includes a pole member, a bobbin and coil assembly, and a magnet which are axially aligned to provide an elongated stator structure which is coaxially disposed in a tubular member which guides the incremental axial movement of the stator. A method for prestressing the elastomeric member for setting the required applied force for axially moving the stator.

6 Claims, 14 Drawing Figures

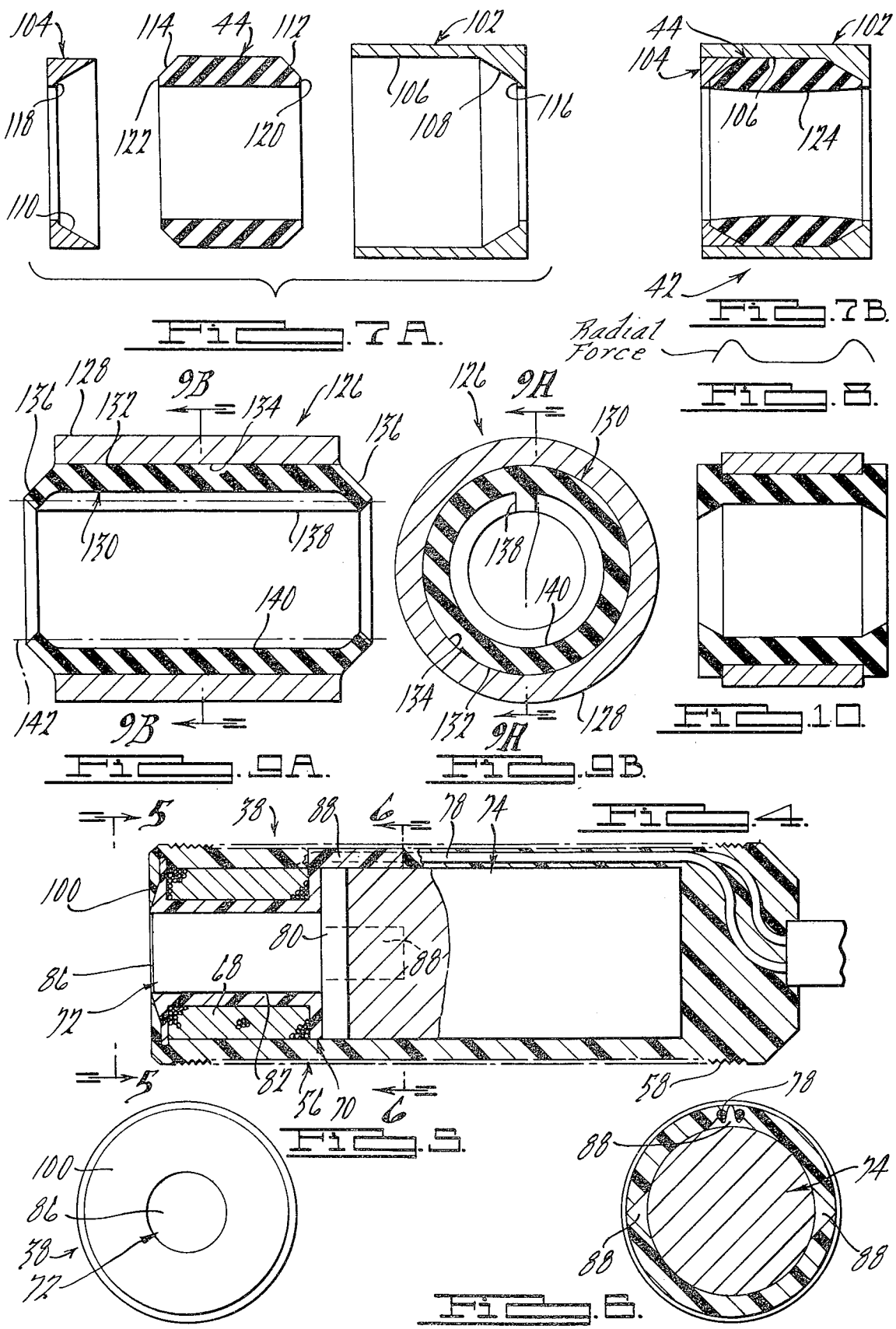

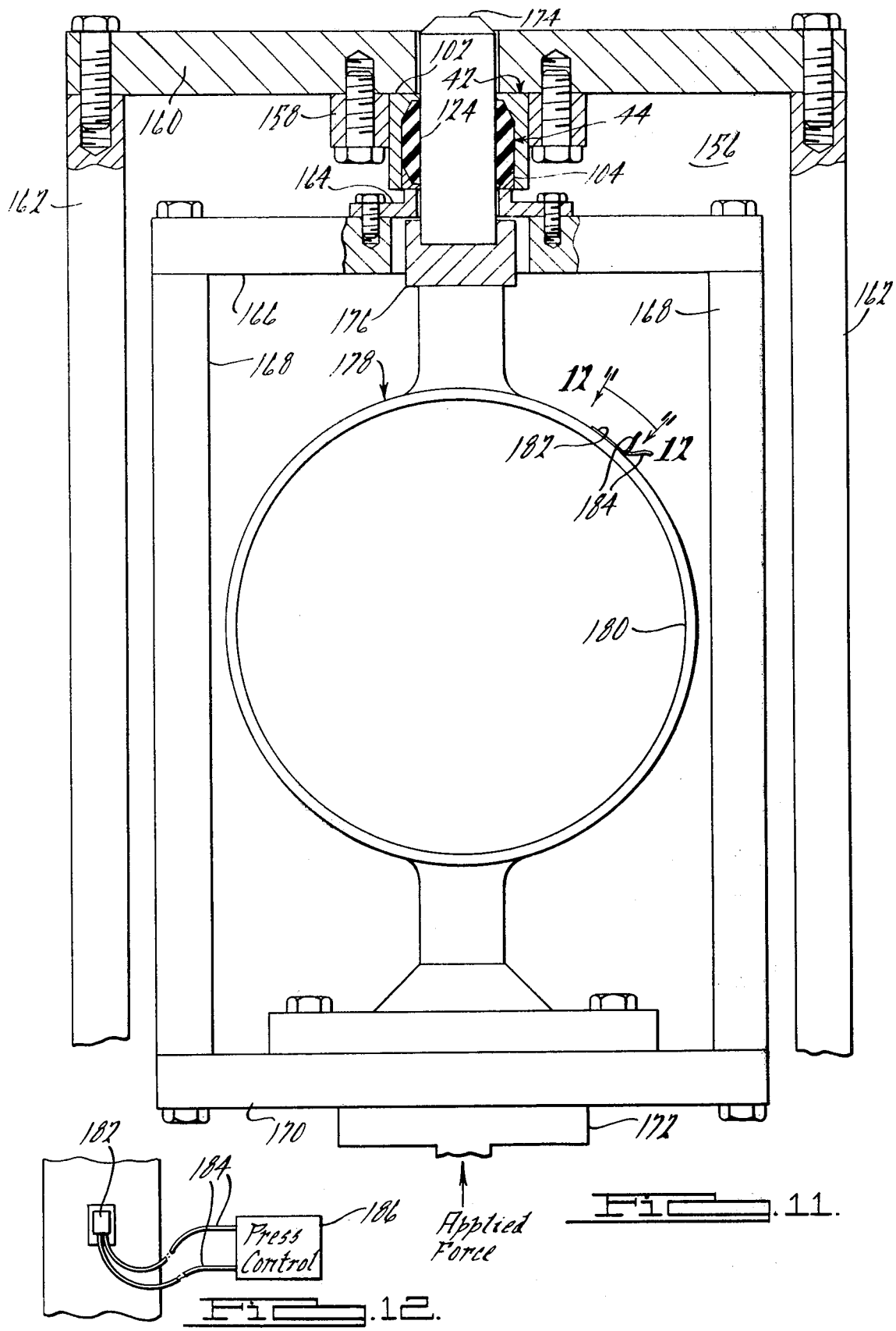

METHOD OF MANUFACTURING A WHEEL SPEED SENSOR

This is a division of application Ser. No. 418,558, filed 11/23/73, now U.S. Pat. No. 3,890,517.

CROSS REFERENCE TO A RELATED APPLICATION

The present invention relates to the invention of the application of William J. Laule Ser. No. 379,936, filed July 17, 1973, now abandoned, and assigned to the assignee of this application. The disclosure of that application is incorporated herein by reference thereto.

BACKGROUND AND SUMMARY OF THE INVENTION

The present invention provides a wheel speed sensor for a road vehicle such as a truck or automobile which is easily installed on the vehicle during the course of mass production of the vehicle, is exceptionally compact, and is well suited for the harsh environment in which it is intended to be operated. Importantly, the wheel speed sensor of the present invention does not require critical adjustments during mounting of the sensor components on the vehicle. The present invention also provides a particularly advantageous method for manufacturing the wheel speed sensor of the present invention.

The sensor of this invention is generally of the variable reluctance type in which the reluctance across an air gap between confronting pole pieces of the rotor and stator is varied by relative movement between the rotor and stator. It is desirable to keep the air gap at a minimum dimension so as to provide the greatest possible output signal from sensor. There are, however, practical limitations on the minimum dimension for a wheel speed sensor air gap since the relatively rotatable parts on which the rotor and stator of the sensor are mounted are subject to deflections and the like which could cause damage to the sensor components if the air gap is too small and the opposed surfaces of the rotor and stator are severely engaged. The present invention advantageously utilizes the inherent deflections between the relatively rotatable parts on which the wheel speed sensor is mounted to set the air gap at a minimum practical dimension. This is accomplished by providing the rotor and stator with confronting surfaces which would not be damaged upon engagement therebetween and by mounting one of the rotor and stator, and preferably the stator, so that it may be moved relative to the other upon engagement between the rotor and stator to establish an air gap which ordinarily prevents engagement between the confronting surfaces of the rotor and stator.

In the preferred form of the present invention, the rotor is a stamping having a plurality of closely spaced circularly distributed openings providing closely spaced circularly distributed portions of magnetic material which are sequentially brought into confrontation with a pole piece on the stator as the rotor rotates relative to the stator thereby providing a variable reluctance path between the rotor and the stator pole piece. The stator includes a body which is substantially flush with the outward face of the pole piece and which is of sufficient dimension relative to the dimension of the rotor openings to avoid intermeshing between the rotor and stator so that occasional engagement between the confronting surfaces of the rotor and stator is non-destructive. In its preferred form, the stator includes a pole piece, a bobbin assembly, and a magnet which are axially aligned in a body molding to form an elongated structure of uniform cross section for convenient disposition in a tubular mounting member. The stator and the tubular mounting member are adapted to provide relative axial movement between the stator and the tubular mounting member. The stator and tubular mounting member cooperate with a resilient member which generally resists or impedes axial movement of the stator relative to the tubular mounting member so that the air gap between the rotor and stator will not change under normal forces applied to the stator consequent vehicle vibration and the like without engagement between the rotor and stator but does not prevent such movement when the stator is engaged by the rotor so that engagement between the stator and rotor may effect movement of the stator to provide the minimum practical air gap. In its preferred form, the resilient member is a tubular elastomeric member which is either configured or prestressed to resist axial movement of the stator until a predetermined axial force is applied to the stator by the rotor. The resilient member preferably provides at least two spaced points of resilient support for the stator. Also, preferably, the stator is provided with a serrated surface which is engaged by the resilient member.

According the the method of the present invention the resilient member is prestressed under simulated operational conditions to set the minimum force which must be applied to the stator by the rotor to cause movement of the stator. In this regard, a member which has approximately the same transverse dimension as the stator so as to simulate the stator is moved relative to the resilient member while in engagement therewith during the prestressing operation and a contemporaneous measurement of the force required to cause such movement is taken. When that force reaches the desired level, the prestressing operation is terminated and the degree of prestress is maintained.

BRIEF DESCRIPTION OF THE DRAWINGS

FIG. 4 is a cross-sectional view of the preferred exemplary embodiment of the stator of the present invention;

FIG. 5 is a view of the stator of FIG. 4 taken in the direction of arrows 5—5 of FIG. 4;

FIG. 6 is a cross-sectional view of the stator of FIG. 4 taken along the lines 6—6 of FIG. 4;

FIG. 7A is a cross-sectional exploded view of the stator mounting structure of FIG. 1;

FIG. 7B is a cross-sectional assembly view of the stator mounting structure of FIG. 1;

FIG. 8 is a chart of the transverse loading provided by the stator mounting structure of FIGS. 7A and 7B;

FIGS. 9A and 9B are cross-sectional views of a second exemplary embodiment of a stator mounting structure of the present invention taken along the lines 6A—6A and 6B—6B, respectively;

FIG. 10 is a cross-sectional view of a third exemplary embodiment of a stator mounting structure of the present invention;

FIG. 11 is a view of a mechanism for prestressing the stator support structure of FIGS. 1, 5A and 5B in the manufacture of the wheel speed sensor of FIG. 1; and FIG. 12 is a view of the stator of FIG. 11 taken in the direction of arrows 12—12 of FIG. 11.

DETAILED DESCRIPTION OF THE PREFERRED EMBODIMENT

Figure 1:
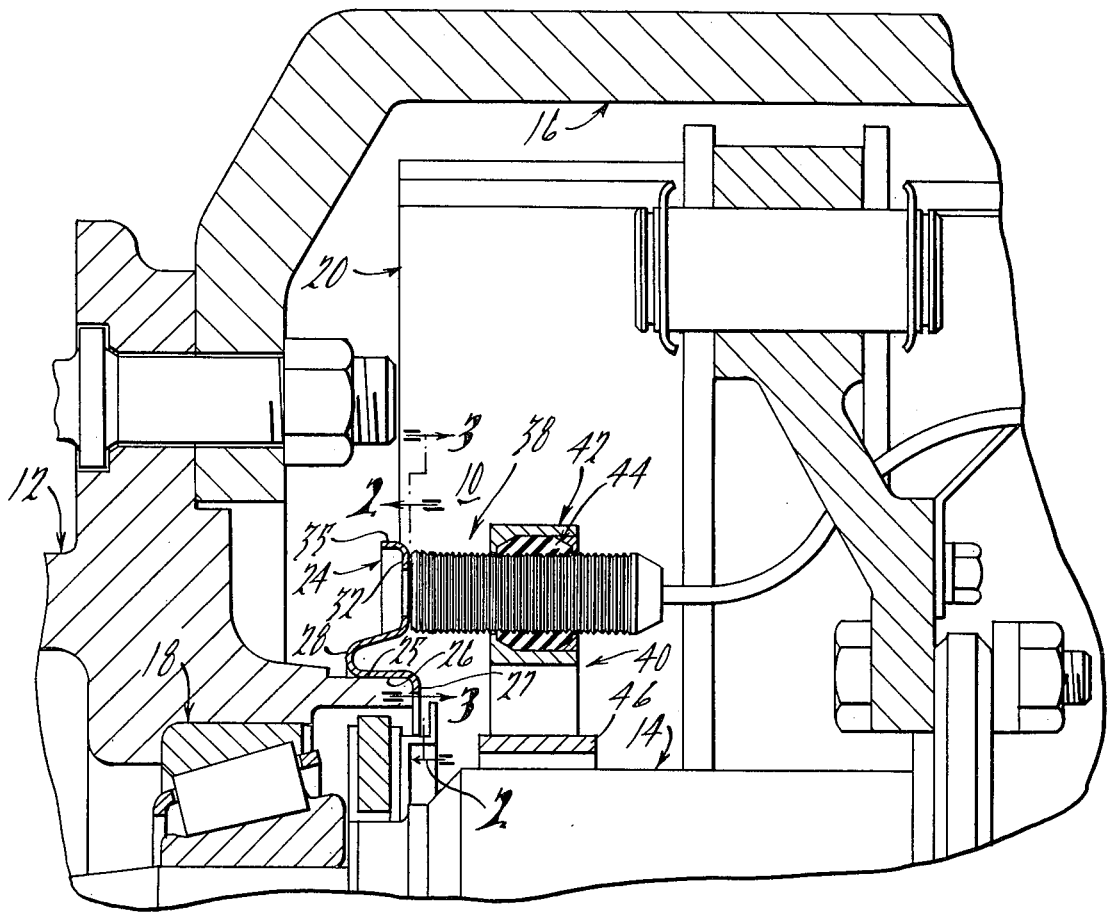
FIG. 1 is an assembly view of a wheel speed sensor according to the present invention in combination with a wheel and axle assembly of a truck.

In FIG. 1, an exemplary wheel speed sensor 10 is illustrated in combination with a wheel 12, a spindle 14 and a brake drum 16. Each of the wheel 12, the spindle 14 and the brake drum 16 are shown in part since the remaining details thereof are not part of this invention. Also shown in FIG. 1 is a bearing 18 which supports the wheel 12 for rotation relative to the spindle 14, and a brake shoe 20 which engages the radially-inward cylindrical surface of the brake drum 16. The wheel 12 and the brake drum 16 are driven for rotation relative to the spindle 14 by a drive shaft (not shown) extending through the spindle 14.

The wheel speed sensor 10 includes a rotor 24 of low-reluctance ferromagnetic material which is secured to the wheel 12 by a pressed, i.e. interference, fit between axially-extending cylindrical surfaces 25 and 26 on the wheel 12 and the rotor 24 respectively. With additional reference now to FIG. 2, the rotor 24 includes a radially-extending locating flange 27, an arcuate portion 28, a generally axially extending intermediate flange 30 and a radially-outwardly extending flange 32 which has a plurality of equal-spaced circumferentially distributed openings 34 which are elongated in the radial direction. The openings 34 provide relatively narrow strips or members of low reluctance material 36 therebetween. The rotor 24 may further include an axially extending stiffening flange 35.

In view of the preceding description of the construction of the rotor 24, it will be appreciated that the rotor 24 may be readily formed from sheet stock by a stamping, drawing, and punching operation resulting in a construction having substantial manufacturing economies relative to past rotor constructions.

Figure 3:
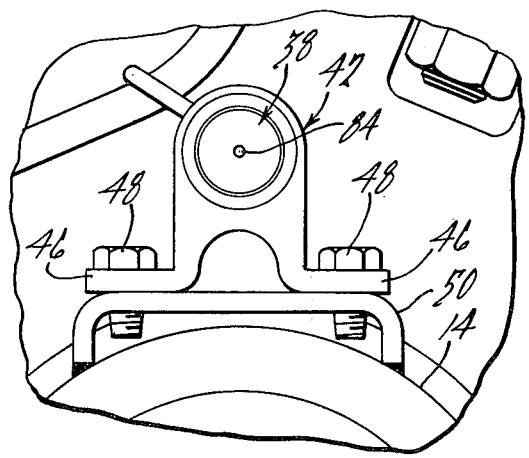
FIG. 3 is a view of a portion of the assembly of FIG. 1 taken in the direction of the arrows 3—3 of FIG. 1.

The wheel speed sensor 10 further includes a stator 38 which is mounted in an operative position relative to the rotor 24 by a mounting structure 40 which secures the stator 38 to the spindle 14. With additional reference to FIG. 3, the mounting structure 40 includes a stator holder 42 which contains a tubular cylindrical resilient member 44 which engages the stator 38. The member 44 is preferably molded of an elastomeric material such as neoprene, rubber, or the like. The stator holder 42 has a pair of extending flanges 47 which are secured by bolts 48 to a bracket 50 which in turn is secured by welding to the spindle 14.

With reference now to FIG. 4, the construction of the sensor 38 can best be appreciated. The wheel speed sensor 38 has a molded body 56 of plastic material which provides a generally cylindrical outer configuration and which has an elongated axial dimension relative to its diameter. The body 56 has a plurality of integral, annular, triangular grooves 58 providing triangular projections which radially-outwardly terminate at the nominal diameter of the cylindrical body 56 which are generally disposed along the axial adjustment range for the body 56 relative to the mounting member 42.

The stator 30 includes a coil 68 wound on a bobbin 70, a coaxially disposed pole piece 72, a coaxially disposed axially polarized cylindrical magnet 74 and axially aligned terminals 76 which are electrically connected to the coil 68 by suitable conductors 78.

The pole piece 72 includes a cylindrical, radially-extending end flange 80 which abuts the bobbin 70, and a cylindrical body portion 82 which is coaxially disposed with the coil 68 and which provides a circular pole face 86, the latter being best seen in FIG. 5. The pole piece face 86 has a diameter which is slightly greater than the width of the magnetic members 36 but less than the length of the magnetic members 36. The bobbin 70 includes a circumferentially-extending U-shaped channel which contains the coil 68 and three circumferentially-spaced, axially-extending members 88. The members 88 locate the pole piece flange 80 and the cylindrical magnet 74 in axial alignment during assembly of the stator 38. One of the members has axially-extending grooves to accommodate the conductors 78. The bobbin 70 has a generally rectangular outer configuration as illustrated in FIG. 6 so as to provide attachment points for the members 88. After the foregoing components are assembled as shown, the body 56 is molded, for example, by an injection molding machine, so as to form the generally elongated cylindrical structure as illustrated. A suitable signal cable 98 extends from the cover 96 which has a pair of conductors connected to respective conductors 78.

The body 56 along with the pole face 86 of the body portion 82 provides an end surface 100 after molding which is substantially greater in transverse dimension than the transverse dimensions of the openings 34 in the rotor 24 and which is substantially smooth, i.e. without projections which would interfere with the openings 34. Accordingly, the surface 100 may be engaged with the flange 32 of the rotor 24 during rotation of the rotor 24 without damage to either the rotor 24 or the stator 38. Consequently, this engagement may be effected to locate the stator 38 relative to the flange 32 to provide a minimum air gap therebetween.

Figure 2:
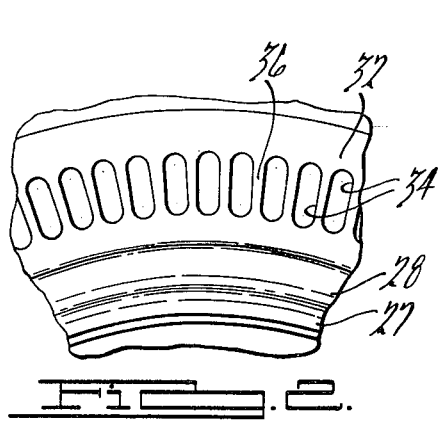
FIG. 2 is a view of a portion of the assembly of FIG. 1 taken in the direction of arrows 2—2 of FIG. 1.

With reference to FIGS. 1 and 2, it can be seen that when the pole face 86 is in confrontation with one of the magnetic strips 36 intermediate the openings 34 a low reluctance path is provided between the pole member 72 and the rotor 24. When the pole face 86 is in confrontation with one of the openings 34, a high reluctance path is provided between the pole piece 72 and the rotor 24. Consequently, as the rotor 24 rotates relative to the stator 38, the reluctance of the air gap between the rotor 24 and the pole piece 72 alternately varies between a high reluctance and a low reluctance condition. The air gap is in a magnetic path which includes the pole piece 72, the magnet 74, the cylindrical mounting member 42, the support bracket 46, the spindle 14, the bearing 18, the wheel 12, and the rotor 24 whereby a complete flux path is provided between opposite poles of the axially polarized cylindrical magnet 74 which is varied in reluctance by the relative rotation of the rotor 24 relative to the stator 38. Consequently, as the rotor 24 rotates relative to the stator 38, an electrical signal is generated in the coil 68 which appears at the conductors 78.

After the wheel speed sensor 10 is installed on the vehicle, the installer axially moves the stator 38 into engagement with the flange 32 of the rotor 24. Subsequently, as the wheel 12 is rotated in use to thereby rotate the rotor 24, any deflections of the wheel 12 relative to the stator 38 due to loading, wheel eccentricity, etc. will cause engagement between the flange 32 and confronting face 100 of the stator 38, which if forceful enough, will move the stator 38 axially away from the rotor 24 to provide a minimum air gap between the rotor 24 and the stator 38 thereby providing a highly efficient magnetic circuit to provide enhanced sensor output signals. However, when such forceful engagement does not occur, the stator 38 is held in place by the resilient gripping action of the resilient member 44 so that the stator does not move as a result of ordinary vibrations and motions of the vehicle.

In FIG. 7A, the component parts of the stator holder 42 are illustrated prior to assembly thereof. In the figure, the stator holder 42 can be seen to include a tubular member 102 and a ring member 104. The tubular member 102 has an internal bore 106 which is matched to the outer diameter of the resilient member 44 so that the resilient member 44 will fit closely within the bore 106. The tubular member 102 and the ring member 104 are provided with opposed circumferentially-extending chamfers 108 and 110 which are adapted to mate with circumferentially-extending chamfers 112 and 114 on the resilient member 44, respectively. The chamfers 108 and 110 are at 30° with respect to the axis of the stator holder 42 whereas the chamfers 112 and 114 are at 45° with respect to the axis of the holder 42 for reasons which will be apparent hereinafter. The tubular member 102 has a radially-inwardly extending flange 116 while the ring member has a radially-inwardly extending flange 118 which are adapted to engage end surfaces 120 and 122, respectively, of the resilient member 44. The outer diameter of the ring member 104 is slightly greater than the bore 106 of the tubular member 102 to provide an interference fit therebetween.

In FIG. 7B, the stator holder 42 is shown in its assembled form with the ring member 104 being disposed within the bore 106 of the tubular member 102, and being retained therein by the pressed fit between the ring member 104 and the tubular member 102. As can be seen in FIG. 7B, the resilient member 44 is captured between the chamfers 108 and 110 and the radially inwardly extending flanges 116 and 118. In the operating positions of the component parts of the stator holder 42 as shown in FIG. 7B, the resilient member 44 is held in axial compression so as to cause radially-inwardly bowing of its bore 124, as shown.

When the stator 38 is inserted into the bore 124 of the resilient member 44, the stator compresses the resilient member 44 substantially along the entire length of the bore 124 of the resilient member 44 so as to provide a distributed radially-inwardly directed force which securely retains the stator 38. Because of the differences in the angulations of the chamfers of the resilient member 44 and the members 102 and 104, a radially-inwardly directed force of increased magnitude is provided in the vicinity of the chamfers generally as depicted in FIG. 8. As a result, the stator 38 is securely held with its axis generally aligned with the axis of the holder by a distributed, radially-inwardly directed force which has increased magnitudes at axially-spaced locations. Since, in the preferred embodiment, the stator 38 is provided with circumferentially-extending serrations, the resilient member 44 adopts a configuration which provides partial interfitting with the serrations 58 to resist axial movement of the stator 38. Further resistance to axial movement of the stator 38 and the resilient member 44 is provided by the frictional engagement therebetween. If the stator 38 is not provided with serrations, this frictional engagement can be set to provide the required resistance to axial movement.

In FIGS. 9A and 9B, another exemplary embodiment of the stator holder according to the present invention is illustrated. The stator holder 126 of FIGS. 9A and 9B includes a tubular support member 128 and an elastomeric member 130. The elastomeric member 130 has an outer cylindrical surface 132 which is secured to an inner cylindrical bore 134 of the support member 128 by an adhesive or the like. The elastomeric member 130 has generally radially-inwardly, and axially-outwardly, extending flanges 136 at axially opposite ends thereof which are joined by an axially-extending radial web 138. It can be seen in FIG. 9A that the flanges 136 are in cantilevered relationship relative to the main body of the resilient member 130 which is secured to the support member 128. Consequently, upon insertion of a stator having an outside diameter which is greater than the diameter of the radially-inwardly most projecting portion of the flanges 136, but slightly less than the nominal diameter of the bore 140, as illustrated by dashed lines 142, the flanges 138 will be deflected radially-outwardly so as to bear upon the stator with a radially-inwardly directed force. The web 138 provides a distributed force along the entire length of the stator 38 to serve to further retain the stator 38. Preferably, the stator has a plurality of serrations therealong into which the web 38 is depressed to provide interfitting engagement therebetween. It can be seen then that the cantilevered flanges 136 provide radially-inward forces at axially spaced locations which tend to secure and maintain an alignment between the axis of the stator and the axis of the holder 126.

In FIG. 10, yet another embodiment of a stator holder according to the present invention is illustrated. The stator holder 144 of FIG. 10 includes a tubular, cylindrical support member 146 and a resilient member 148. As in the previous embodiments, the resilient member 148 may be made of an elastomeric material such as rubber, neoprene, or the like. The resilient member 148 has an axially-elongated, circumferentially-extending notch 150 which receives and is closely fitting with the support member 146 so as to securely retain the resilient member 148 on the support member 146. The resilient member 148 has flanges 152 and 154 formed by radial outside surfaces and chamfered inside surfaces to form a pair of axially-spaced triangular projections having radially-inwardly pointing apexes. Consequently, it will be appreciated that the stator support member 144 is similar in function to the stator support member 126 of FIGS. 9A and 9B.

In FIG. 11, the preferred apparatus for performing the method according to this invention for assembling the stator support structure 42 of FIGS. 1–7 is illustrated. The apparatus 156 of FIG. 11 is shown in operative relationship with a stator support member 42 as previously described. More particularly, the tubular member 102 of the stator support member 42 is located within an annular locating member 158 which is in turn fixedly supported with respect to the base of the apparatus 156 by connections through a transverse plate 160 and side supports 162. The ring member 104 of the stator support member 42 is engaged by an annular member 164 which is in turn connected to a press mechanism to receive an applied force as illustrated through a transverse plate 166, inner side supports 168, and a transverse plate 170. The transverse plate 170 is movable by press member 172 which is shown only in part.

The apparatus 156 further includes a gaging member 174 which is inserted through the bore 124 of the resilient member 44 and which is connected by a gaging member socket 176 to a ring gage 178. The ring gage 178 is mounted on the transverse plate 170 so as to be movable with the press member 172 towards the stator support member 42. The ring gages as illustrated at 178 are commonly used to measure compressive forces applied thereto by measurement of the deformation of a ring portion 180 of the ring gage 178. The ring portion 180 has a strain gage 182 affixed to its peripheral surface, which is best seen in FIG. 12, for measuring the deformation of the ring portion 180. More particularly, as the compressive force on the gage member 174 increases, the deformation of the ring 180 increases so as to increase the resistance of the strain gage 182. The strain gage 182 has a pair of leads 184 which are operatively connected to an appropriate control 186 for the press.

In the assembly of the stator holder 42, the resilient member 44 is inserted within the tubular member 102 and the assembly is positioned in the support member 158. The ring member 104 is positioned on the press member 164, and thereafter, the press member 172 is moved upwardly to insert the gage member 174 into the bore 124 of the resilient member 44 and to bring the ring member 104 into engagement with the internal bore of the tubular member 102. The ring member 104 is then pressed into the bore of the tubular member 102 to cause compression of the resilient member 44. At the same time, the gage member 174 is moved upwardly with the press member 172 and a measurement of the drag or axial force applied to the gage member 174 by virtue of its frictional engagement with the resilient member 44 is measured by the strain gage 182. The pressing operation continues until the resilient member 44 has been prestressed to a degree which establishes a desired magnitude of the axially-directed frictional force on the gage member 174 as measured by the strain gage 182. When that magnitude of force is reached, the press control opens a switch or the like to stop the movement of the press.

Although a simulation of the stator 38 is used in the apparatus 156, an actual stator may be used provided that it is mounted in such a way to prevent damage thereto. Moreover, if desired, a gage member 174 may be used which is serrated like the stator to more closely approximate the conditions which result in the resistance to axial movement between the stator 38 and the resilient member 44. When the gage member 174 has a smooth external surface as shown, and the stator holder 42 will be combined with a stator 38 having serrations, an appropriate calibration factor may be used to correlate the force on the gage member 174 with the minimum force which causes movement of the stator 38 relative to the stator holder 42.

In view of the preceding description of an exemplary preferred embodiment of the present wheel speed sensor, it will be appreciated that the present invention provides a wheel speed sensor which is readily mountable on a vehicle during the course of mass production of the vehicle, is exceptionally compact, and is well suited for the harsh environment in which it will operate. Importantly, the wheel speed sensor of the present invention does not require critical position adjustments during the mounting of the sensor components on the vehicle during the mass production process, and further, damage because of engagement between the rotor and stator of the wheel speed sensor which may occur during deflections of the spindle or wheel is avoided.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

What is claimed is:

1. A method for prestressing a resilient member to establish a predetermined resistance to relative motion between said resilient member and a related member which is adapted for a predetermined operative restrantive relationship with said resilient member comprising the steps of:
   slidably moving said related member, or a simulation thereof, relative to said resilient member while said related member, or said simulation thereof, is in said operative restraintive relationship with said resilient member;
   prestressing said resilient member in a manner so that the degree of prestressing of said resilient member is varied;
   measuring the resistance to said relative motion between said related member, or said simulation thereof, and said resilient member while the degree of prestressing is varied; and
   maintaining the degree of prestressing when said predetermined resistance to said relative motion is attained.

2. A method according to claim 1 wherein said related member is a stator of a speed sensor having a cooperative rotor, or a simulation thereof, and said resistance to said relative motion resists movement of said stator relative to said rotor.

3. A method according to claim 2 wherein said related member is said simulation of said stator.

4. A method according to claim 1 wherein said related member, or said simulation thereof, is in engagement with said resilient member when in said predetermined operative relationship with said resilient member.

5. A method according to claim 1 wherein said resilient member at least partially surrounds said related member, or said simulation thereof.

6. A method according to claim 1 wherein said resilient member fully surrounds said related member, or said simulation thereof.

* * * * *